March 20, 1956 W. J. SIGANOFF 2,739,241

APPARATUS FOR USE IN X-RAY DIFFRACTION ANALYSIS

Filed June 21, 1952

INVENTOR.
WILLIAM J. SIGANOFF
BY
A. J. Nydick

United States Patent Office 2,739,241

Patented Mar. 20, 1956

2,739,241

APPARATUS FOR USE IN X-RAY DIFFRACTION ANALYSIS

William J. Siganoff, Springfield, N. J., assignor to United States Testing Company, Inc., Hoboken, N. J., a corporation of New York Application June 21, 1952, Serial No. 294,897

12 Claims. (Cl. 250—52)

This invention relates generally to apparatus for use in X-ray diffraction analysis and is concerned more particularly with a holder or fixture for retaining and rotating a blank or plate that is being subjected to X-ray analysis.

As is well known, quartz-plate oscillators are employed in controlling the frequency of electronic apparatus. The particular advantage and adaptability of quartz-plate oscillators in this connection derives from the phenomenon that a quartz plate maintains its frequency, within limits, with changes in temperature. The desirable degree of control of a quartz-plate oscillator is a function of the relationships that exist between the face planes of a quartz plate and the atomic planes that exist within the mother crystal, and hence, within the plate itself.

Because of their short wave-length, X-rays can be "diffracted" by the atomic structure of crystalline substances, generally referred to as crystal lattices. For this reason X-rays are used as the most accurate means of controlling the atomic plane orientation of quartz oscillator plates. The two most commonly used orientations of quartz atomic plane relationships in the production of quartz oscillator plates are the ZZ' or optic axis and the XX' or the electrical axis. These axes lie at 90 degrees to each other with rotation in the plane of the quartz plate faces.

At various stages in the commercial production of quartz oscillator plates it is necessary precisely to determine the face-to-atomic-plane relationships of the plate. A true axial relationship cannot be determined unless the X-ray beam is refracted along the same atomic plane relationship that exists between the sawed plate and the mother rock. Accordingly, in modern quartz-plate manufacturing technique the optic axis (ZZ') direction in the plate is optically ascertained initially and marked on the plate prior to X-ray measurement. This procedure is required since, if the atomic plane direction in the plate is not co-incident with the direction of the X-ray beam used in measurement, a true reading is not obtained.

Conventional plate-holding fixtures currently available are characterized by a number of serious disadvantages and inadequacies which are completely eliminated in the novel and improved construction of the present invention. For example, a common feature of conventional plate-holding fixtures is the provision of a mechanical reference guide for the edge of the inserted plate, thereby implicitly assuming a relationship of edge dimension to atomic plane direction which all too frequently is incorrect from an X-ray analysis standpoint. Moreover, in the X-ray analysis of plates in initial and intermediate rough stages of processing before any fixed plate dimensional relationships have been determined, a mechanical reference guide on the holding fixture is of no value whatever.

A further disadvantage of X-ray diffraction apparatus of conventional design resides in the inconvenient and cumbersome sequence of operations required. The plate being analyzed may be inserted in the holder only if both hands are employed. A hand operated shutter is then opened allowing the analyzing beam to fall on the plate. The reading is made, the shutter raised, the plate removed, the plate turned 90 degrees, the plate reinserted, the shutter lowered, and a second reading made.

In contradistinction to conventional practice, it is an object of the present invention to provide a holder designed and constructed in such a manner as to enable single-handed insertion of the plate, single handed lowering of the shutter, and the consecutive reading of angles at 90 degree intervals in a simple and rapid manner, all being done without requiring the reinsertion of the plate.

Another feature of the invention resides in an arrangement which makes possible the insertion of the plate in the holder in a simple and accurate manner independently of the relationships existing between edge directions and axial directions of the plate. This is accomplished by providing on the face plate of the holder a pair of indexing cross-lines, corresponding to the 90 degree interval stops of the holder, which may be readily visually aligned with the predetermined optical axis (ZZ') marking on the plate.

An additional feature of the invention consists of the employment of a holder element having a large flat face area which does not require periodic lapping to restore original flatness due to the fact that insertion of oscillator plates may be made from any direction rather than with fixed orientation. As a consequence the wear on the face area of the holder is substantially uniform.

A further feature of the invention is the provision of a holder which may be easily and continuously rotated in either a clockwise or counter-clockwise direction, and which permits insertion of a blank or plate at any selected angular setting of the holder and which allows a subsequent reading to be made at a 90 degree interval without requiring the removal and reinsertion of the plate.

Still another feature of the invention is the novel design and arrangement of the holder which not only makes for compactness and sturdy construction but which allows passage of the incident and reflected analyzing beam without danger of X-ray beam interference.

The foregoing features as well as additional features and advantages of the invention will readily appear in the course of the following detailed description taken in connection with the accompanying drawing which illustrates a preferred embodiment of the invention, and wherein.

Figures 1, 2, 3:
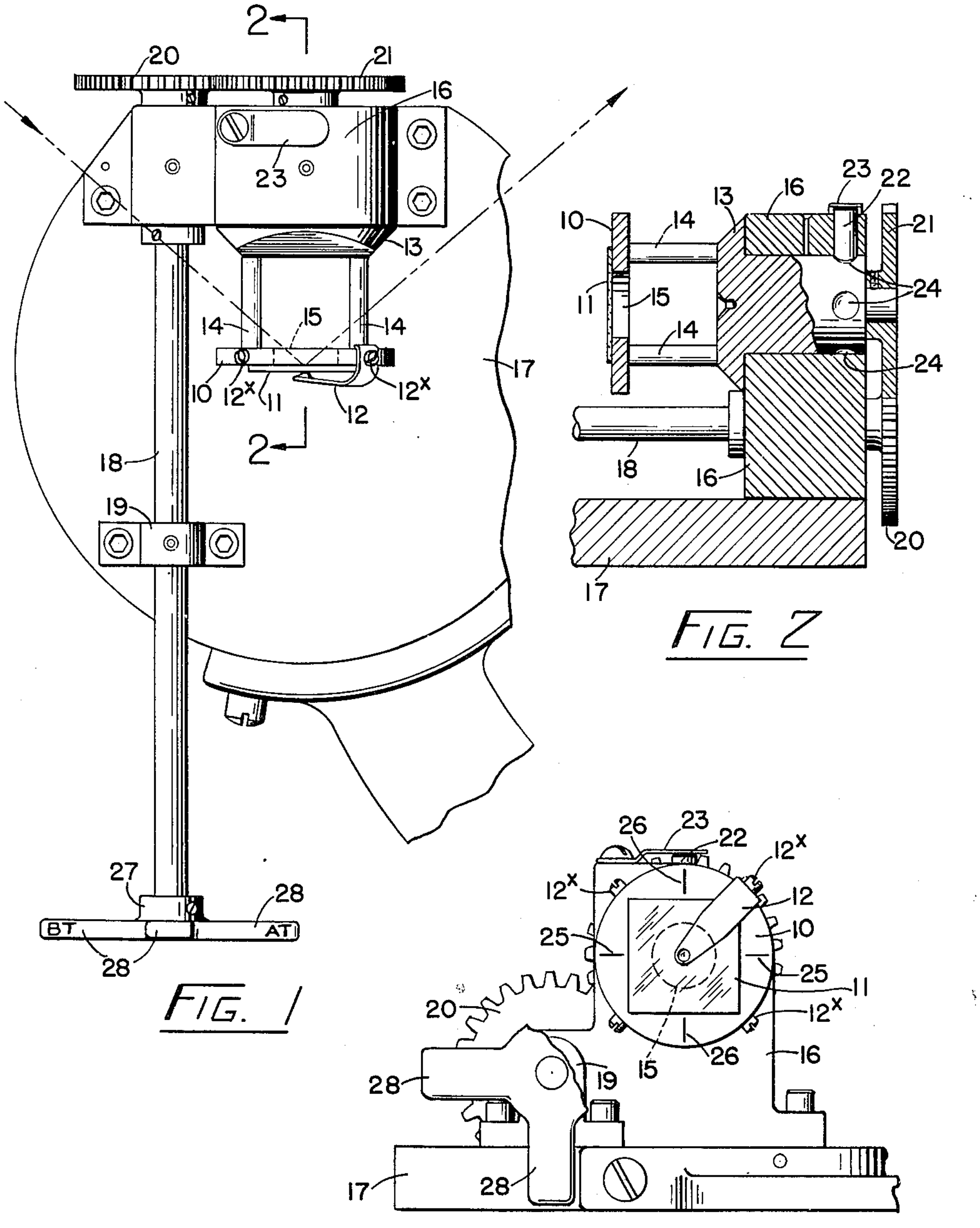
Fig. 1 is a fragmentary top plan view of a holder embodying the principles of the invention.
Fig. 2 is a vertical sectional view taken along line 2—2 of Fig. 1.
Fig. 3 is a front elevational view of the holder.

It will be understood that the holder device or fixture of the present invention is adaptable for universal application in the identification, by X-ray diffraction analysis, of atomic plane relationships in quartz plates and the like. It will be further understood that the holder device of the present invention may be employed in conjunction with the various X-ray diffraction units currently in use and is adaptable for use as a component portion of apparatus designed for similar applications. In the accompanying drawing, however, only the essential features of construction of the holder device or fixture itself are illustrated.

Referring now to the drawing in greater detail, the device comprises a holder or retaining element 10 rotatable in a vertical plane and adapted for supporting a plate or blank 11 as by means of a resilient spring member of clip 12, which is affixed by appropriate means, as for example, set screw 12$^x$. Holder element 10 is spaced from and connected to a rotor member 13 by means of connecting pins or rods 14. The connecting pins 14 are spaced apart in such a manner as to allow passage of the incident and refracted X-ray beams to and from the incident surface of the plate 11, as will be readily seen in Fig. 1. In order to allow access of the X-ray beam, holder element 10 is provided with a central aperture 15. Rotor 13 is retained in a bearing member or housing 16 fixedly mounted on the base plate or goniometer table 17 of the X-ray unit.

Rotor 13 and holder element 10 are preferably arranged to be remotely actuated from the front of the device by a manually operable control shaft 18 mounted in bearing member 16 and auxiliary bearing 19. Shaft gear 20 meshes with a rotor gear 21 in order operatively to connect control shaft 18 with rotor 13.

As best seen in Figs. 2 and 3, rotor 13 is arranged to be releasably adjusted at 90 degree interval stops by yieldable locking means. This locking means may take the form of a detent or plunger 22 retained in bearing member 16 and biased by means of spring 23 for selective registration within a given indexing recess 24 suitably disposed on rotor 13 to provide 90 degree interval stops for said rotor and for holder element 10. The front face of holder element 10 is provided with a pair of mutually perpendicular, indexing cross-lines 25 and 26 corresponding to the 90 degree interval settings of the holder, said cross-lines being nominally parallel and perpendicular respectively to base plate or table 17 of the fixture. In taking a reading with the device the predetermined optical axis marking (ZZ′), not shown, of plate 11 is first visually aligned with one of the horizontally disposed index lines 25, 26 corresponding to a given setting in locked position of rotatable holder element 10 and rotor 13.

In order to provide for convenient rotation of holder element 10 in either clockwise or counter-clockwise direction from a selected operative angular setting, control shaft 18 carries at its forward end a handle element 27 preferably defining four radical spokes 28. In the preferred embodiment of the invention illustrated in the drawing the uppermost side of each handle spoke 28 is stamped or marked in some convenient manner to indidate to the operator the direction of rotation used in normal convention in measuring the two most frequently used types of crystal blank cuts, to wit, the symbols, AT and BT. Thus, as best seen in Fig. 1, the right handle spoke 28 is marked "AT" and left handle spoke 28 is marked "BT" to aid the operator in selecting the correct conventional direction of rotation depending upon the crystal type of the blank being measured. The blank is rotated 90 degrees to the right from the ZZ′ (optic axis) measuring position to normally read XX′ (electrical axis) in a "BT" cut and the rotation is reversed 90 degrees to the left for the "AT" cut. Bearing down on the spoke marked for the appropriate type of blank being measured will rotate the holder element 10 in the correct direction and greater accuracy and consistency in readings will be obtained.

It will be noted that in any adjusted operative setting of the device, such as indicated in Fig. 1, holder element 10 is so disposed with respect to the analyzing X-ray beam that the beam is directed toward the center of holder aperture 15 and toward the plane of the blank 11 closest to the incident beam.

The provision of the indexing cross-lines 25 and 26 for visual alignment with the predetermined ZZ′ marking (optic axis) on the plate 11 assures a true reading since the arrangement of the invention establishes co-incidence of the atomic plane direction in the plate with the direction of the analyzing X-ray beam in a position manner without resorting to the inherently inaccurate alignment obtained in the use of conventional mechanical guide references which assume a frequently inaccurate relationship of edge dimension to atomic plane direction.

Since certain modifications may be made in the device of the present invention without departing from the scope thereof, it is intended that all matter contained in the foregoing description and shown in the accompanying drawing be interpreted merely as illustrative of the principles thereof and not in a limiting sense, and accordingly that the appended claims are to be construed as defining the invention within the full spirit and scope thereof.

I claim:

1. In a holder device for X-ray analysis, a holder element rotatable in opposite directions in a predetermined vertical plane, said holder element comprising a specimen-supporting plate spaced apart from and disposed forwardly of a rotatable member, resilient retaining means carried by said holder element for the reception of a plate specimen being analyzed, a housing member, yieldable fixedly lockable locking means disposed between said housing member and said holder element for adjusting said holder element at predetermined angular intervals, and manually operable means for controlling the rotation of said holder element.

2. In a holder device for X-ray analysis, a holder element rotatable in opposite directions in a predetermined vertical plane, resilient retaining means carried by said holder element for the reception of a plate specimen being analyzed, a housing member, a rotor member carried by said housing member and coaxial with said holder element, connecting members maintaining said holder element disposed forwardly of and in spaced relation with respect to said rotor member to provide passage for an externally generated incident analyzing beam and toward and away from said holder element, yieldable fixedly lockable locking means disposed between said housing member and said rotor member for adjusting said rotor member and holder element at predetermined angular intervals, and manually operable means for controlling the rotation of said holder element.

3. In a holder device for X-ray analysis, a holder element rotatable in opposite direction in a predetermined vertical plane, said holder element comprising a specimen-supporting plate spaced apart from and disposed forwardly of a rotatable member, resilient retaining means carried by said holder element for the reception of a plate specimen being analyzed, a housing member, yieldable fixedly lockable locking means disposed between said housing member and said holder element for adjusting said holder element at predetermined angular intervals, indexing lines disposed upon the front face of said holder element and corresponding with a given angular setting of said holder element, and manually operable means for controlling the rotation of said holder element.

4. In a holder device for X-ray analysis, a holder element rotatable in opposite direction in a predetermined vertical plane, resilient retaining means carried by said holder element for the reception of a plate specimen being analyzed, a housing member, a rotor member carried by said housing member and coaxial with said holder element, connecting members maintaining said holder element disposed forwardly of and in spaced relation with respect to said rotor member to provide passage for an analyzing beam toward and away from said holder element, yieldable fixedly lockable locking means disposed between said housing member and said rotor member for adjusting said rotor and holder element at predetermined angular intervals, indexing lines disposed upon the front face of said holder element and corresponding with a given angular setting of said holder element, and manually operable means for controlling the rotation of said holder element.

5. In a holder device for X-ray analysis, a holder element rotatable in opposite directions in a predetermined vertical plane, resilient retaining means carried by said holder element for the reception of a plate specimen being analyzed, a housing member, a rotor member carried by said housing member and coaxial with said holder element, connecting members maintaining said holder element disposed forwardly of and in spaced relation with respect to said rotor member to provide passage for an externally generated incident analyzing beam toward and away from said holder element, yieldable locking means disposed between said housing member and said rotor member for adjusting said rotor member and holder element at predetermined angular intervals, said yieldable locking means comprising a spring-biased plunger and said rotor being provided with a plurality of spaced apart indexing recesses for the reception of said plunger to determine a given angular setting of said holder element, and manually operable means for controlling the rotation of said holder element.

6. In a holder device for X-ray analysis, a holder element rotatable in opposite directions in a predetermined vertical plane, resilient retaining means carried by said holder element for the reception of a plate specimen being analyzed, a housing member, a rotor member carried by said housing member and coaxial with said holder element in spaced relation with respect to said rotor member to provide passage for an analyzing beam toward and away from said holder element, said holder element being disposed forwardly of said rotor member, yieldable locking means disposed between said housing member and said rotor member for adjusting said rotor and holder element at predetermined angular intervals, said yieldable locking means comprising a spring-biased plunger and said rotor being provided with a plurality of spaced apart indexing recesses for the reception of said plunger to determine a given angular setting of said holder element, indexing lines disposed upon the front face of said holder element and corresponding with a given angular setting of said holder element, and manually operable means for controlling the rotation of said holder element.

7. In a holder device for X-ray analysis, a centrally apertured holder element rotatable in opposite directions in a predetermined vertical plane, resilient retaining means carried by said holder element for the reception of a plate specimen being analyzed, a housing member, a rotor member carried by said housing member and coaxial with said holder element, connecting members maintaining said holder element disposed forwardly of and in spaced relation with respect to said rotor member to provide passage for an externally generated incident analyzing beam toward and away from said holder element, yieldable fixedly lockable locking means disposed between said housing member and said rotor member for adjusting said rotor member and holder element at 90 degree interval settings, and manually operable means for controlling the rotation of said holder element.

8. In a holder device for X-ray analysis, a centrally apertured holder element rotatable in opposite directions in a predetermined vertical plane, resilient retaining means carried by said holder element for the reception of a plate specimen being analyzed, a housing member, a rotor member carried by said housing member and coaxial with said holder element, connecting members maintaining said holder element disposed forwardly of and in spaced relation with respect to said rotor member to provide passage for an analyzing beam toward and away from said holder element, yieldable fixedly lockable locking means disposed between said housing member and said rotor member for adjusting said rotor member and holder element at 90 degree interval settings, a pair of mutually perpendicular indexing lines disposed upon the front face of said holder element and corresponding with a given 90 degree interval setting of said holder element, and manually operable means for controlling the rotation of said holder element.

9. In a holder device for X-ray analysis, a centrally apertured holder element rotatable in opposite directions in a predetermined vertical plane, resilient retaining means carried by said holder element for the reception of a plate specimen being analyzed, a housing member, a rotor member carried by said housing member and coaxial with said holder element, connecting members maintaining said holder element disposed forwardly of and in spaced relation with respect to said rotor member to provide passage for an externally generated incident analyzing beam toward and away from said holder element, yieldable locking means disposed between said housing member and said rotor member for adjusting said rotor member and holder element at 90 degree interval settings, said yieldable member comprising a spring-biased plunger and said rotor being provided with four equally spaced apart indexing recesses for the reception of said plunger to determine a given 90 degree interval setting of said holder element, and manually operable means for controlling the rotation of said holder element.

10. In a holder device for X-ray analysis a centrally apertured holder element rotatable in opposite directions in a predetermined vertical plane, resilient retaining means carried by said holder element for the reception of a plate specimen being analyzed, a housing member, a rotor member carried by said housing member and coaxial with said holder element, connecting members maintaining said holder element disposed forwardly of and in spaced relation with respect to said rotor member to provide passage for an anlyzing beam toward and away from said holder element, yieldable locking means disposed between said housing member and said rotor member for adjusting said rotor member and a holder element at 90 degree interval settings, said yieldable locking means comprising a spring-biased plunger and said rotor being provided with four equally spaced apart indexing recesses for the reception of said plunger to determine a given 90 degree interval of setting of said holder element, a pair of metal perpendicular indexing lines disposed upon the front face of said holder element and corresponding with a given 90 degree interval setting of said holder element, and manually operable means for controlling the rotation of said holder element.

11. In a holder device for X-ray analysis, a holder element rotatable in opposite directions in a predetermined vertical plane, resilient retaining means carried by said holder element for the reception of a plate specimen being analyzed, a housing member, a rotor member carried by said housing member and coaxial with said holder element, connecting members maintaining said holder element disposed forwardly of and in spaced relation with respect to said rotor member to provide passage for an externally generated incident analyzing beam toward and away from said holder element, yieldable locking means disposed between said housing member and said rotor member for adjusting said rotor member and holder element at predetermined angular intervals, said yieldable locking means comprising a spring-biased plunger and said rotor being provided with a plurality of equally spaced apart indexing recesses for the reception of said plunger to determine a given angular setting of said holder element, and manually operable means for controlling the rotation of said holder element.

12. In a holder device for X-ray analysis, a holder element rotatable in opposite directions in a predetermined vertical plane, resilient retaining means carried by said holder element for the reception of a plate specimen being analyzed, a housing member, a rotor member carried by said housing member and coaxial with said holder element in spaced relation with respect to said rotor member to provide passage for an analyzing beam toward and away from said holder element, said holder element being disposed forwardly of said rotor member, yieldable locking means disposed between said housing member and said rotor member for adjusting said rotor and holder element at predetermined angular intervals, said yieldable locking means comprising a spring-biased plunger and said rotor being provided with a plurality of equally spaced apart indexing recesses for the reception of said plunger to determine a given angular setting of said holder element, indexing lines disposed upon the front face of said holder element and corresponding with a given angular setting of said holder element, and manually operable means for controlling the rotation of said holder element.

References Cited in the file of this patent

UNITED STATES PATENTS

| | | |
|---|---|---|
| 1,988,993 | Bouwers et al. | Jan. 22, 1935 |
| 2,394,622 | Luley | Feb. 12, 1946 |
| 2,410,621 | Babbitt | Nov. 5, 1946 |
| 2,430,969 | Young | Nov. 18, 1947 |
| 2,445,132 | Berman | July 13, 1948 |
| 2,626,359 | Weber, Jr. | Jan. 20, 1953 |